United States Patent [19]

Wilson et al.

[11] Patent Number: 4,862,631

[45] Date of Patent: Sep. 5, 1989

[54] ARTIFICIAL FISH BAIT

[75] Inventors: William H. Wilson; Clyde S. Gudermuth, Jr., both of Fort Smith, Ark.

[73] Assignee: EBSCO Industries, Inc., Leeds, Ala.

[21] Appl. No.: 60,678

[22] Filed: Jun. 11, 1987

[51] Int. Cl.[4] ............................................. A01K 85/00
[52] U.S. Cl. ................................................... 43/42.33
[58] Field of Search ................. 43/42.33, 42.34, 42.35, 43/42.53

[56] References Cited

U.S. PATENT DOCUMENTS 2,407,680 9/1946 Palmquist et al. .
2,547,240 4/1951 Young .................. 43/42.34
3,257,751 6/1966 Benttinen ............. 43/42.33
3,360,882 1/1968 Belokin ................ 43/42.33
3,367,060 2/1968 Abercrombie ......... 43/42.33
3,494,065 2/1970 Benttinen ............. 43/42.33

Primary Examiner—Gene P. Crosby
Attorney, Agent, or Firm—Laney, Dougherty, Hessin & Beavers

[57] ABSTRACT

A fishing lure which includes a hard body having a light reflective metallic coating adjacent the body, and having a monolayer of small glass spheres overlying the metallic coating. The glass spheres are preferably solid and have a diametric size in the range of from about 40 microns to about 75 microns. The glass spheres are embedded in a coating of clear lacquer or polyurethane.

11 Claims, 1 Drawing Sheet

ARTIFICIAL FISH BAIT

FIELD OF THE INVENTION

This invention relates to fishing lures, and more particularly to an artificial fish bait which reflects and refracts light in a way which causes the bait to visually resemble a naturally occurring forage fish species.

BACKGROUND OF THE INVENTION

1 Brief Description of the Prior Art

Many types of fishing lures are geometrically configured, and carry finishes which enable the lure to resemble as closely as possible certain natural, live bait fish. Thus, many types of popular fishing lures resemble, in varying degrees of similarity, one or more of the shad species which constitute the natural food for many types of game fish.

In constructing a lure to resemble a natural species of minnow, or other natural food of the game fish, the finish placed on the lure is important. One technique which utilizes the phenomena of light reflectance to cause the lure to shine or appear like a natural bait species is to metallize the lure body by a vacuum metallizing process. Such metallizing places a thin layer of shiny metal, such as aluminum or nickel, in a specular finish on the outer side of the body of the lure. The metallized coating of the lure then causes it to reflect light in a way which to some degree resembles a "shiner" or small minnow.

Another technique which has been utilized for simulating natural species is the painting of minute scales on the body of the lure in simulation of the scales perceptible on a shad or minnow.

U.S. Pat. No. 2,407,680 discloses a reflex light reflector which includes a light-returning layer of small transparent spheres which are supported upon a light-reflecting surface beneath the spheres. A continuous overlying transparent solid coating or covering is provided, and conforms to the front or forward extremities of the spheres and has a flat front face. The spheres have a refractive index which is at least 1.15 times that of the transparent covering which overlies these spheres. This reflex light reflector refracts and reflects light incident upon the device in a way such that the light appears to be intensified to a viewer viewing the device. This light reflector is disclosed as being utilized on a flat surface with a specific thickness of light transmissive material separating the spherical elements from the back reflecting surface. So far as I am aware, such a sphere-containing, composite coating or finish has not been used on a curved surface or in providing an improved, more natural appearing artificial fishing lure.

2 Brief Description of the Present Invention

The present invention provides a fishing lure which simulates to a remarkable degree a characteristic of certain natural bait species of fish, such as minnows and shad. This property is that of appearing to change colors slightly as the bait species moves or shifts its position. The color change will typically appear to be from a silvery or dull white color to a yellowish white cast.

I have found that by the utilization of a certain finishing technique, and more specifically, the manner in which certain coatings are placed on the external surface of the lure body, the described phenomena of movement induced color change can be caused to characterize the lures of the invention. Thus, as the lure is shifted in its position relative to a light source and to an observer, the color of the lure appears to change with such movement and positional change. Moreover, the outer surface finish of the lure appears to have a greater depth than many other types of lures which are conventionally finished or coated.

Broadly described, the fishing lure of this invention includes a hard body which may be made of wood, metal or plastic, and which is provided with a light reflective metallic coating placed on the outer surface of the body. A monolayer of substantially uniformally sized, small, solid glass spheres is then placed over the reflective metallic coating and the spheres are adhered thereto. The glass microspheres are embedded, finally, in a clear protective coating such as lacquer or clear polyurethane.

An important object of the invention, as thus described, is to provide a fishing lure which is more natural in its appearance, and relatively closer in its similarity, to natural species constituting the forage of game fish.

An additional object of the invention is to provide an artificial fishing lure which, as it is moved through the water, appears to change in its light reflectivity characteristics, including appearing to change color.

A further object of the invention is to provide a unique finish on a fishing lure which can be relatively inexpensively placed on the lure, but which is unique in its refraction and reflection of light impinging upon the lure so as to make the lure more attractive to game fish.

Additional objects and advantages of the invention will become apparent as the following detailed description of the invention is read and considered in conjunction with the accompanying drawings which illustrate a preferred embodiment of the invention, and which serve to demonstrate the basic principles entailed in such preferred embodiment, as well as in other alternate embodiments not specifically illustrated.

GENERAL DESCRIPTION OF THE DRAWINGS

FIG. 1 is a side elevation view of a lure constructed in accordance with the present invention.

FIG. 2 is a sectional view taken along line 2—2 of FIG. 1. The thickness of the coatings, and the relative size of the coatings in relation to the lure body have been exaggerated simply for the purpose of facilitating the description of the several coatings or layers placed on the lure body in accordance with the present invention. FIG. 3 is a sectional detail view which is enlarged to facilitate a better explanation of the coatings utilized in the construction of the lure in accordance with the present invention.

DETAILED DESCRIPTION OF A PREFERRED EMBODIMENT OF THE INVENTION

Figure 2:
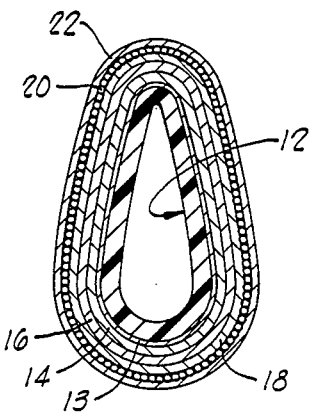
Figure 3:
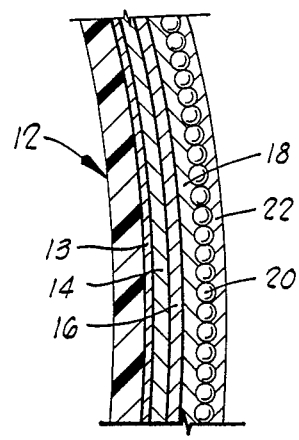

At the outset, it should be pointed out that FIGS. 2 and 3 herein have not been drawn to scale and are not literal sectional views, but rather that dimensions have been slightly exaggerated in order to more clearly portray certain aspects of the invention, and to facilitate explanation of the manner in which the fishing lure is constructed. The thickness and dimensions of various layers, and of the microspheres which are used in providing a composite external coating on the fishing lure body, will be described in more detail in the ensuing description of the invention.

Figure 1:
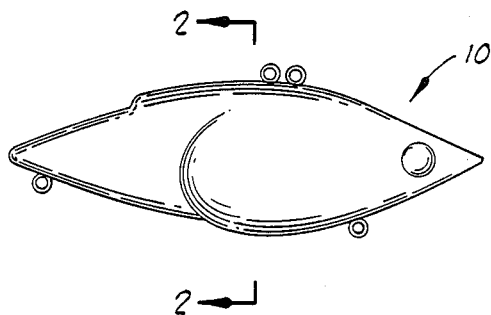

Referring initially to FIG. 1, illustrated there is a typical artificial fishing lure 10 constructed in accordance with the present invention. The lure 10 may be variously shaped in ways which differ from the lure shown in FIG. 1, but includes, in general, a plurality of curved surfaces which cooperate with the particular materials placed thereupon to give the unusual light reflective and refractive effects hereinafter described.

Typically, the artificial lure 10 will include a body 12 constructed of wood, plastic or metal. Although the lure body may be solid, it is more frequently hollow and is preferably constructed by the injection molding of plastic. Injection molding of plastic hollow artificial fishing lure bodies is well known in the art, and the plastic or synthetic resin utilized can be of several types. A preferred plastic for use in the lure of the present invention is acrylonitrile butadiene styrene (ABS). Other plastics which can be employed in the construction of a hollow lure body include polycarbonate, polystyrene and cellulose acetate butyrate. Where a solid wooden body is to be utilized, balsa wood can be employed as the material of construction. In lures made by injection molding synthetic resin, the hollow lure body 10 will typically have a thickness of from about 0.020 to about 0.080 inch. The injection molding procedure can be utilized to make an infinite variety of shapes of lures. The lures of the present invention, however, preferably simulate aquatic fauna which constitute the natural bait of various game fish, such as bass and crappie. Included in such species of bait are minnows, shad and the like.

Initially a varnish base coat 13 is applied to the synthetic resin lure body. Applied, then, to the varnished outer surface of the synthetic resin body 12 is a highly specular metallic layer or substrate 14. The metallic substrate 14 can typically be placed on the lure body 12 by a vacuum metallizing process widely utilized in the art. Fishing lures which have a shiny, metallic exterior surface formed by vacuum metallizing are well known. While aluminum constitutes a preferred metal for use in the vacuum metallizing process, nickel and chromium finishes can be electroplated on the outer surface of the lure body 12. The metal, when deposited at this location, is highly light reflective and functions in the overall functioning of the final composite coating or finish which is applied to the lure body to reflect incident light back toward a visual observer.

Typically, the thickness of the metallic coating 14 on the lure body is from about 0.15 mils to about 0.3 mils, with a thickness of about 0.2 mils being preferred.

A protective top coat 16 is next applied over the vacuum metallized layer or substrate coating 14. The use of the top coat 16 helps in enhancing and maintaining the appearance of the metallic base or substrate. The protective top coat is preferably a water insoluble lacquer, but can also be a one or two component polyurethane system. The lacquer or polyurethane must be clear and light transparent in order to permit light to impinge upon, and be reflected by, the metallized substrate. The protective top coat 16 can be put on in any of several ways, such as by painting, spraying or dipping. Typically, the thickness of the top coat utilized will range from about 0.1 mils to about 0.3 mils. The protective top coating sets to a hardened state, upon curing. Typically, the top coating can be cured by oven drying for 15 minutes at 140° F. Where the lure body is metal, the top coating is cured an additional 30 minutes at 190° F. Curing can be effected by air drying or by heating.

After application of the top coat 16 to the metallic substrate 14, a tack coat 18 is applied to the lure. The tack coat 18 is also a light transparent lacquer coating, but is constituted to cause the lacquer thereof to have an extended curing period and to remain tacky or sticky over an extended period of time. A suitable lacquer material for use as the tack coat is clear enamel or varnish. A butyl-methacrylate polymer resin can also be utilized. Certain two-component polyurethane compositions can also be employed for the purpose of making up the tack coat. The tack coat 18 also can be applied in several ways, including dipping, spraying or painting the lacquer material on the lure.

The thickness of the tack coat applied to the lure body is from about 0.05 mils to about 0.1 mils, with a thickness of about 0.5 mils preferred.

After the tack coating 18 is applied over the top coat 16 on the lure, a monolayer of transparent microspheres 20 is applied to the lure. The microspheres 20 are very small beads which are preferably solid and preferably made of glass. The size of the microspheres ranges from about 40 to about 75 microns in diameter, with from about 50 to about 60 microns being the preferred diametric size. Stated differently, the mesh size of the microspheres which are utilized is from about 230 to about 270 mesh.

The microspheres 20 are preferably quite uniform in size and shape, and in a preferred embodiment of the invention, not more than two percent of the microspheres depart from their spherical configuration. This is attained by screening or classifying the spheres prior to usage so as to eliminate dust and jagged or fractured pieces.

It is also important that the glass of which the microspheres are constructed be of good clarity and light transmissibility. Although the glass beads or microspheres 20 are solid, hollow microspheres, while much more difficult to fabricate, can also be utilized.

The glass which is preferably utilized in the microspheres 20 has a refractive index of from about 1.8 to about 2.3, with a refractive index of from about 1.9 to about 2.2 being most preferred. The glass will contain from about 5 to about 7 percent by weight of glass which is crystalized, and preferably contains a titania ($TiO_2$) content of from about 70 weight percent to about 80 weight percent. A lead silicate glass having a refractive index of approximately 2.04 can also be used. One type of glass microsphere or bead 20 which can be utilized effectively is a solid microsphere made of a glass identified as No. 910 and marketed by the 3M Company of Minneapolis, Minnesota. In an alternate embodiment of the invention, a clear acrylic synthetic resin can be used instead of glass.

The microspheres are preferably applied to the lure body 12 by dipping the body into a fluidized bed of the glass or clear plastic microspheres 20 while the tack coating 18 is still tacky and thus adhesively functional. The fluidized bed of microspheres presents the small beads bubbling up and forming an air entrained and sustained cloud. The lure body is plunged into this cloud of microspheres and then immediately removed therefrom in a substantially instantaneous continuous motion. After this, the lure is lightly jarred, such as by tapping the forward diving plane against a surface. This results in any of the microspheres 20 which are superimposed on the monolayer which contacts the tack coat layer 18 being knocked off, and removed from the lure body. In other words, the microspheres 20 adhered to the tack coat 18 stay in position and any second layer of superimposed microspheres falls off upon the lure being tapped.

After the tack coat 18 has set (preferably by air drying) with the microspheres 20 adhered thereto in a monolayer, another coating process is carried out in which from three to five layers of clear or transparent lacquer are sprayed or dip coated on the lure until the outer surface of the coating 22 of lacquer is a smooth monoplanar surface, and the outer peripheral surfaces of the microspheres are not exposed. The coating 22 of lacquer then has a total thickness of from about 2 mils to about 15 mils, with from about 5 mils to about 10 mils constituting the preferred thickness. It is important that the composite outer top coat 22 be developed by several consecutive applications of relatively thin coatings, because if an application results in a heavy coating being placed on the lure too quickly, or if the last top coat is applied by dipping, the underlying tack coat 18 may be softened to such an extent that it becomes liquid and will run off the lure body, carrying with it most of the microspheres. When the final composite top coating 22 is layered on in multiple thin coats by spraying, this danger of softening to the point of coating disruption and loss is obviated. Each layer applied by spraying is permitted to dry before another thin layer is applied over that by a subsequent spraying procedure. Drying is preferably carried out in an oven in order to accelerate the process.

A pigmented transparent paint can be applied over the last top coat in order to impart various color patterns to the lure.

In an alternate embodiment of the invention, the initial top coat which overlies the metallic substrate and the tack coat which overlies the top coat can be together constituted by a single coating material which is responsive to ultraviolet light to undergo curing to a hardened state. This embodiment offers the advantage, of course, of requiring the application of only a single material, instead of two materials, as in the case of the top coat and tack coat previously described in referring to the manufacture of the lure as set forth above. This same type of material which is responsive to ultraviolet light curing can be used for the final embedding of the glass microspheres, thus replacing the final top coat 22 previously described.

In using such material, it is initially applied over the metallic substrate, and the beads are then embedded in the material and it is cured at that time by ultraviolet light irradiation. Following this, additional UV-sensitive material is placed over the beads to completely imbed them and form a smooth outer surface. Final curing is then again achieved by the use of ultraviolet light. A material which is suitable for use in this way, and which is responsive to ultraviolet radiation to undergo curing is a commercially available composition sold under the name UVBT53R4UV Curable Basecoat/Topcoat by Red Spot Paint and Varnish Co.

Fishing lures constructed in accordance with the present invention have a strikingly natural appearance. Where an aluminum metallized substrate is used, and clear lacquer is employed for the tack coat and the top coat, an effect which is similar to the iridescence or guanine effect from natural fish scales characterizes the lure finish. The reflected light seems to emanate from a source located at a depth within or below the surface of the coating. As the lure is turned, the color of the reflected light changes — that is, the wavelength absorption characteristics of the coatings appear to be such that in one angulation or orientation of the lure in the incident light, the reflected light will appear, for example, to be a pale yellowish or yellowish off-white in color, and in another angulation or orientation, the reflected light will appear to be silver or white. The lure thus has a surprising similarity to some natural bait species.

The curved surface of the lure will appear to be quite bright and luminous in the center of a curved convexity, and the light will then tend to be a little more dull on the edges of the curve as it breaks away from the center of the curve. The bright shiny portion at the center of the curve convexity will appear to be at a greater depth in the body of the lure than it actually is.

Although a preferred embodiment of the present invention has been herein described in order to illustrate the basic principles utilized in the invention, changes and innovations in the precise structural characteristics herein elucidated for purposes of example can be effected without departure from the basic principles. Changes and innovations of this type are therefore deemed to be circumscribed by the spirit and scope of the present invention, except as the same may be necessarily limited by the appended claims or reasonable equivalents thereof.

What is claimed is:

1. A fishing lure comprising:
   a rigid lure body having external, convexly curved surfaces thereon;
   a light reflective, metallize substrate substantially evenly coated upon the convexly curved external surfaces of said lure;
   a plurality of clear, light transparent, substantially uniformly sized microspheres adhered to said reflective metallized substrate in a single monolayer, said microspheres having an average diameter of from about 40 microns to about 75 microns; and
   a clear, light transparent, exterior coating surrounding and covering said microspheres, said exterior coating having a smooth outer surface uninterrupted by any protuberance caused by any of said microspheres, said outer surface being smoothly curved in precise conformity to the convex curvature of said rigid lure body, said exterior coating having a relatively uniform thickness as measured from said smooth outer surface thereof to the curved, external surface of the lure body over which the exterior coating lies, and said exterior coating having a thickness, as measured from said smooth outer surface of said coating to the inner surface of said coating of from about 2 mils to about 15 mils, and said uniformly thick, curving exterior coating cooperating with said microspheres and with said light reflective metallized substrate to impart an optical appearance of exaggerated coating depth and thickness to said exterior coating at locations adjacent said convex curvatures of surface when the lure is viewed by an observer, and to also cause changes in the wavelength of light incident upon the convexly curved surfaces so that the lure appears to undergo changes in color shade over parts of its surface as it moves relative to the eye of an observer.

2. A fishing lure as defined in claim 1 wherein said microspheres are characterized in having an index of refraction of from about 1.8 to about 2.3, and in having a substantially uniform size and configuration such that at least about eighty percent of said microspheres have a spherical configuration, and said microspheres having a composition of from about five weight percent to about seven weight percent of crystallized glass.

3. A fishing lure as defined in claim 1 and further characterized as including:
   a top coating of clear, light transparent, water insoluble lacquer secured to said metallized substrate; and
   a tack coat of clear, light transparent, water insoluble lacquer over and secured to said top coating and bonded to said microspheres for holding said microspheres in a position between a light source and said metallized substrate, said microspheres being positioned in juxtaposition to each other so that said single monolayer consists of microspheres which contact each other without any substantial spacing between any one of said microspheres and the surrounding microspheres, and positioned so that none of said microspheres tough said light reflective, metallized substrate.

4. A fishing lure as defined in claim 1 wherein said microspheres are glass.

5. A fishing lure as defined in claim 4 wherein said glass contains from about 70 weight percent to about 80 weight percent of titanium dioxide.

6. A fishing lure as defined in claim 1 wherein said reflective metallized substrate contains aluminum metal.

7. A fishing lure as defined in claim 1 wherein said lure further comprises:
   a top coating over, and bonded to, said metallized substrate, said top coating being a material selected from the group consisting of:
      a clear, water insoluble, light transparent lacquer; and
      a clear polyurethane; and
   a tack coat over the top coating and secured thereto, said tack coat having a tacky characteristic facilitating the bonding of said microspheres thereto while said tack coat undergoes curing to a hardened non-tacky state.

8. A fishing lure as defined in claim 1 wherein said lure is further characterized in having a coating over and bonded to said metallized substrate and adhering to said microspheres, said coating consisting of an ultraviolet light curable material which is tacky prior to exposure to ultraviolet light, and which sets up to a hardened state upon exposure to ultraviolet light.

9. A fishing lure as defined in claim 3 whereas said microscopheres are solid glass having a refractive index of from about 1.8 to about 2.3

10. A fishing lure as defined in claim 9 wherein the refractive index is from about 1.9 to about 2.3

11. A fishing lure as defined in claim 9 wherein said reflective metallized substrate contains aluminum metal.

* * * * *

UNITED STATES PATENT AND TRADEMARK OFFICE
CERTIFICATE OF CORRECTION

PATENT NO. : 4,862,631
DATED : September 5, 1989
INVENTOR(S) : William H. Wilson and Clyde S. Gudermuth, Jr.

It is certified that error appears in the above-identified patent and that said Letters Patent is hereby corrected as shown below:

In the Claims:
In Column 7, line 20, delete "tough" and insert -touch-.
In Column 8, line 25, delete "2.3" and insert -2.2-.

Signed and Sealed this

Seventeenth Day of July, 1990

Attest:

HARRY F. MANBECK, JR.

Attesting Officer

Commissioner of Patents and Trademarks